J. F. BECKER.
Grain-Separators.
No. 207,842. Patented Sept. 10, 1878.
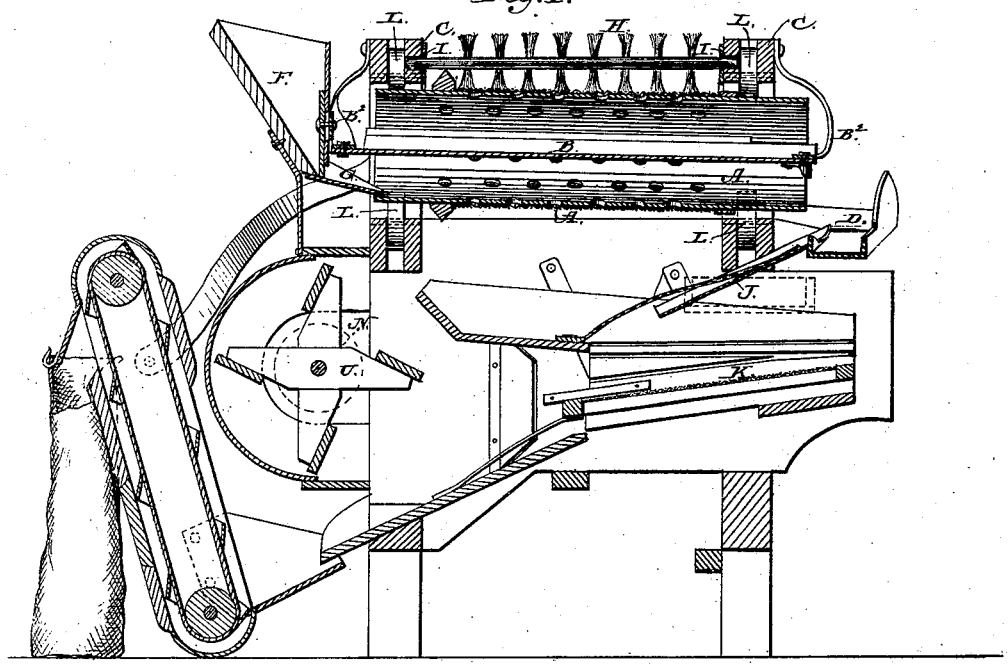
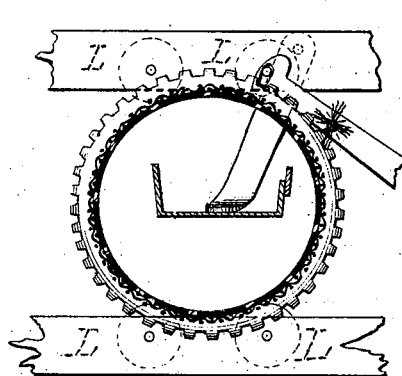
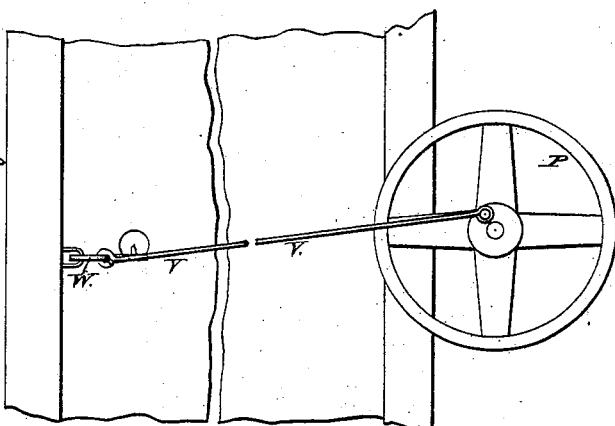
Attest:
J. F. Reigart.
D. T. Cowl
Inventor:
John F. Becker
by Nathan W. Fitzgerald,
his Attorney.

UNITED STATES PATENT OFFICE.

JOHN F. BECKER, OF HARTFORD, MINNESOTA.

IMPROVEMENT IN GRAIN-SEPARATORS.

Specification forming part of Letters Patent No. 207,842, dated September 10, 1878; application filed April 27, 1877.

*To all whom it may concern:*

Be it known that I, JOHN F. BECKER, of Hartford, Todd county, State of Minnesota, have invented certain new and useful Improvements in Grain-Separators; and I hereby declare the following to be an exact description thereof, reference being had to the accompanying drawings, and to the letters of reference marked thereon, in which—

Figure 1 is a longitudinal vertical section; Fig. 2, a transverse detail sectional view, and Fig. 3 a detail view.

The object of my invention is to provide means for the more thorough taking out of the cockle, and for cleaning the grain more effectually and rapidly; and my invention will be more particularly described in the specification, and pointed out in the claims.

A represents the revolving drum, made of zinc and covered with sieve-cloth, and perforated with round apertures, and having a cockle-pan, B, supported inside of the drum, extending its whole length, and agitated and supported by springs $B^2$ at each end of the pan. The springs are attached to the frame C of the machine.

D is the cockle-spout, running crosswise behind the drum. It carries the cockle to the receiver, fastened to the side of the machine.

F is an adjustable hopper or grain-holder at the front of the cockle-drum. It is adjusted by pressing a lever up or down, for the purpose of regulating the feed; G, the agitating-spout, conducting the grain from the grain-holder F to the cockle-drum A.

H is the cockle-extracting brush at the top of the machine, and revolving on the outside surface of the cockle-drum or sieve-cloth A. The clearing-brush serves not only to clear away the dust, small particles, seeds, &c., from the wire-gauze, but also to discharge any grain which may become lodged in the wire meshes, so as to keep the gauze constantly free from obstructions, and permit the separation of the cockle, which may contain small grain worth saving, from the dust, small seeds, and other fine impurities. The brush is mounted at either end on supporting-arms I, pivoted to the frame, and capable of independent adjustment, so as to compensate for the wear of the brush in use.

J is the pan conducting the grain to the sieves K K. The pan is fastened under the cockle-drum.

L L are friction-rollers, set into the frame C above and below the ends of the cockle-drum as travelers, to support and aid the revolution of the drum.

P is the fly-wheel at the side of the machine.

The machine is operated by turning the main driving-wheel N toward the shoe and sieves, and the feed is regulated by a slide near the bottom on the inside of the hopper F, working vertically.

U is the fan-wheel of the machine, that cleans the grain; V, the connecting-rod attached to the fly-wheel P and sieves K K, with its elbow W to vibrate the sieves.

What I claim as my invention, and desire to secure by Letters Patent, is—

1. The combination of the sheet-metal cockle-drum A, covered with wire sieve-cloth, and the clearing-brush H, revolving on the outside of said drum and in contact with the sieve-cloth, substantially as herein set forth.

2. The combination of the sheet-metal cockle-drum A, covered with wire sieve-cloth, and the adjustable clearing-brush H, revolving in contact with the outside of said drum, substantially as herein st forth.

3. The combination of the sheet-metal cockle-drum A, covered with wire sieve-cloth, and the clearing-brush H, revolving in contact with the outside of said drum, said clearing-brush being supported at both ends in independently-adjustable bearings I, substantially as herein set forth.

JOHN F. BECKER.

Witnesses:
RICHARD HANDY,
HENRY BECKER.